US009262372B1

(12) United States Patent
Kabbani et al.

(10) Patent No.: US 9,262,372 B1
(45) Date of Patent: Feb. 16, 2016

(54) ACHIEVING BALANCED INTERCONNECTIVITY IN A COMPUTER NETWORK

(71) Applicant: Google Inc., Mountain View, CA (US)

(72) Inventors: Abdul Kabbani, Los Gatos, CA (US); Robert Felderman, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 13/917,042

(22) Filed: Jun. 13, 2013

(51) Int. Cl.

| | |
|---|---|
| ***G06F 15/16*** | (2006.01) |
| ***G06F 15/177*** | (2006.01) |
| ***H04L 12/947*** | (2013.01) |

(52) U.S. Cl.
CPC .............. *G06F 15/177* (2013.01); *H04L 49/25* (2013.01)

(58) Field of Classification Search
USPC .......................................................... 709/220
See application file for complete search history.

(56) References Cited

U.S. PATENT DOCUMENTS

| | | | | |
|---|---|---|---|---|
| 7,152,113 | B2 * | 12/2006 | Reynders et al. | 709/238 |
| 2008/0175173 | A1 * | 7/2008 | Ross et al. | 370/256 |
| 2011/0038628 | A1 * | 2/2011 | Caviglia et al. | 398/58 |

* cited by examiner

*Primary Examiner* — Tu Nguyen
(74) *Attorney, Agent, or Firm* — Edward A. Gordon; Foley & Lardner LLP

(57) ABSTRACT

Systems and methods of configuring a computer network are provided. The network can include a first stage of M nodes and a second stage of N nodes. Each node in the first stage can form F communication links with nodes in the second stage and each node in the second stage can form S communication links with nodes in the first stage. Nodes in the first stage are connected to each other only through communication links connecting nodes in the first stage to nodes in the second stage. Communication links between the nodes can be assigned such that the minimum value of the throughput between any pair of nodes in the first stage is maximized.

21 Claims, 12 Drawing Sheets

400

Provide a first stage of M nodes and a second stage of N nodes
405

Assign, between each pair of nodes including one node in the first stage and one node in the second stage, a number of communication links
410

Define a binary matrix representing the network
415

Assign an additional communication link to each node pair whose corresponding matrix cell has a value of 1
420

560

| | $522_0$ | $522_1$ | $522_2$ | $522_3$ | $522_4$ | $522_5$ |
|---|---|---|---|---|---|---|
| $512_0$ | 1 | 1 | 1 | 0 | 0 | 0 |
| $512_1$ | 0 | 1 | 1 | 1 | 0 | 0 |
| $512_2$ | 0 | 0 | 1 | 1 | 1 | 0 |
| $512_3$ | 0 | 0 | 0 | 1 | 1 | 1 |
| $512_4$ | 1 | 0 | 0 | 0 | 1 | 1 |
| $512_5$ | 1 | 1 | 0 | 0 | 0 | 1 |

| | $512_0$ | $512_1$ | $512_2$ | $512_3$ | $512_4$ | $512_5$ |
|---|---|---|---|---|---|---|
| $512_0$ | N/A | 2 | 1 | 0 | 1 | 2 |
| $512_1$ | 2 | N/A | 2 | 1 | 0 | 1 |
| $512_2$ | 1 | 2 | N/A | 2 | 1 | 0 |
| $512_3$ | 0 | 1 | 2 | N/A | 2 | 1 |
| $512_4$ | 1 | 0 | 1 | 2 | N/A | 2 |
| $512_5$ | 2 | 1 | 0 | 1 | 2 | N/A |

| | $622_0$ | $622_1$ | $622_2$ | $622_3$ | $622_4$ | $622_5$ |
|---|---|---|---|---|---|---|
| $612_0$ | 1 | 1 | 1 | 0 | 0 | 0 |
| $612_1$ | 1 | 1 | 0 | 1 | 0 | 0 |
| $612_2$ | 0 | 0 | 1 | 1 | 1 | 0 |
| $612_3$ | 0 | 0 | 1 | 1 | 0 | 1 |
| $612_4$ | 1 | 0 | 0 | 0 | 1 | 1 |
| $612_5$ | 0 | 1 | 0 | 0 | 1 | 1 |

| | $612_0$ | $612_1$ | $612_2$ | $612_3$ | $612_4$ | $612_5$ |
|---|---|---|---|---|---|---|
| $612_0$ | N/A | 2 | 1 | 1 | 1 | 1 |
| $612_1$ | 2 | N/A | 1 | 1 | 1 | 1 |
| $612_2$ | 1 | 1 | N/A | 2 | 1 | 1 |
| $612_3$ | 1 | 1 | 2 | N/A | 1 | 1 |
| $612_4$ | 1 | 1 | 1 | 1 | N/A | 2 |
| $612_5$ | 1 | 1 | 1 | 1 | 2 | N/A |

Figure 6D

ACHIEVING BALANCED INTERCONNECTIVITY IN A COMPUTER NETWORK

BACKGROUND

Cloud computing and its applications are effecting a qualitative shift in the way people communicate and share information. The underlying computer networks that support cloud computing can be divided into two major categories: intra-datacenter and inter-datacenter. Intra-datacenter networks interconnect the computing infrastructure (servers, disks) within the same building or among different buildings of a datacenter campus; inter-datacenter networks connect multiple datacenters distributed at different geographic locations. Many modern high-speed data links use optical transmission technologies via optical fibers for both intra- and inter-datacenter networks.

SUMMARY OF THE INVENTION

Aspects and implementations of the present disclosure are directed to systems and methods for achieving balanced interconnectivity in a computer network.

At least one aspect is directed to a computer-implemented method for configuring a network. The network can include a first stage of M nodes and a second stage of N nodes. Each node in the first stage can form F communication links with nodes in the second stage and each node in the second stage can form S communication links with nodes in the first stage. The method can include assigning, between each pair of network nodes including one node in the first stage and one node in the second stage, a number of communication links equal to $(F-(F \% N))/N$. The method can include defining a binary matrix representing the network. Rows of the matrix can represent nodes in the lower stage, columns in the matrix can represent nodes in the upper stage, and values of cells in the matrix can represent the remaining communication links between each node pair. The method can include setting the value of each cell of the matrix to a 1 or a 0, such that a number of 1s in each row of the matrix does not exceed a first selected value, a number of 1s in each column of the matrix does not exceed a second selected value, and a number of 1s in the same column for any two rows of the matrix is equal to one of the floor and ceiling of a third selected value. The method can include assigning an additional communication link to each node pair whose corresponding matrix cell has a value of 1.

At least one aspect is directed to a system for configuring a network. The network can include a first stage of M nodes and a second stage of N nodes. Each node in the first stage can form F communication links with nodes in the second stage and each node in the second stage can form S communication links with nodes in the first stage. The system can include a data processing system configured to assign, between each pair of network nodes including one node in the first stage and one node in the second stage, a number of communication links equal to $(F-(F \% N))/N$. The data processing system can be configured to define a binary matrix representing the network. Rows of the matrix can represent nodes in the lower stage, columns in the matrix can represent nodes in the upper stage, and values of cells in the matrix can represent the remaining communication links between each node pair. The data processing system can be configured to set the value of each cell of the matrix to a 1 or a 0, such that a number of 1s in each row of the matrix does not exceed a first selected value, a number of 1s in each column of the matrix does not exceed a second selected value, and a number of 1s in the same column for any two rows of the matrix is equal to one of the floor and ceiling of a third selected value. The data processing system can be configured to assign an additional communication link to each node pair whose corresponding matrix cell has a value of 1.

At least one aspect is directed to a non-transitory computer readable storage medium having instructions encoded thereon which, when executed by a processor, cause the processor to perform a method for configuring a network. The network can include a first stage of M nodes and a second stage of N nodes. Each node in the first stage can form F communication links with nodes in the second stage and each node in the second stage can form S communication links with nodes in the first stage. The method can include assigning, between each pair of network nodes including one node in the first stage and one node in the second stage, a number of communication links equal to $(F-(F \% N))/N$. The method can include defining a binary matrix representing the network. Rows of the matrix can represent nodes in the lower stage, columns in the matrix can represent nodes in the upper stage, and values of cells in the matrix can represent the remaining communication links between each node pair. The method can include setting the value of each cell of the matrix to a 1 or a 0, such that a number of 1s in each row of the matrix does not exceed a first selected value, a number of is in each column of the matrix does not exceed a second selected value, and a number of 1s in the same column for any two rows of the matrix is equal to one of the floor and ceiling of a third selected value. The method can include assigning an additional communication link to each node pair whose corresponding matrix cell has a value of 1.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 5C is a matrix representation of the interconnectivity slack shown in FIG. 5B, according to an illustrative implementation.

FIG. 5D is an overlap matrix associated with the unbalanced network shown in FIG. 5A, according to an illustrative implementation.

FIG. 6C is a matrix representation of the interconnectivity slack shown in FIG. 6B, according to an illustrative implementation.

FIG. 6D is an overlap matrix associated with the balanced network shown in FIG. 6A, according to an illustrative implementation.

DESCRIPTION OF CERTAIN ILLUSTRATIVE IMPLEMENTATIONS

Following below are more detailed descriptions of various concepts related to, and implementations of, systems and methods for achieving balanced interconnectivity in a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
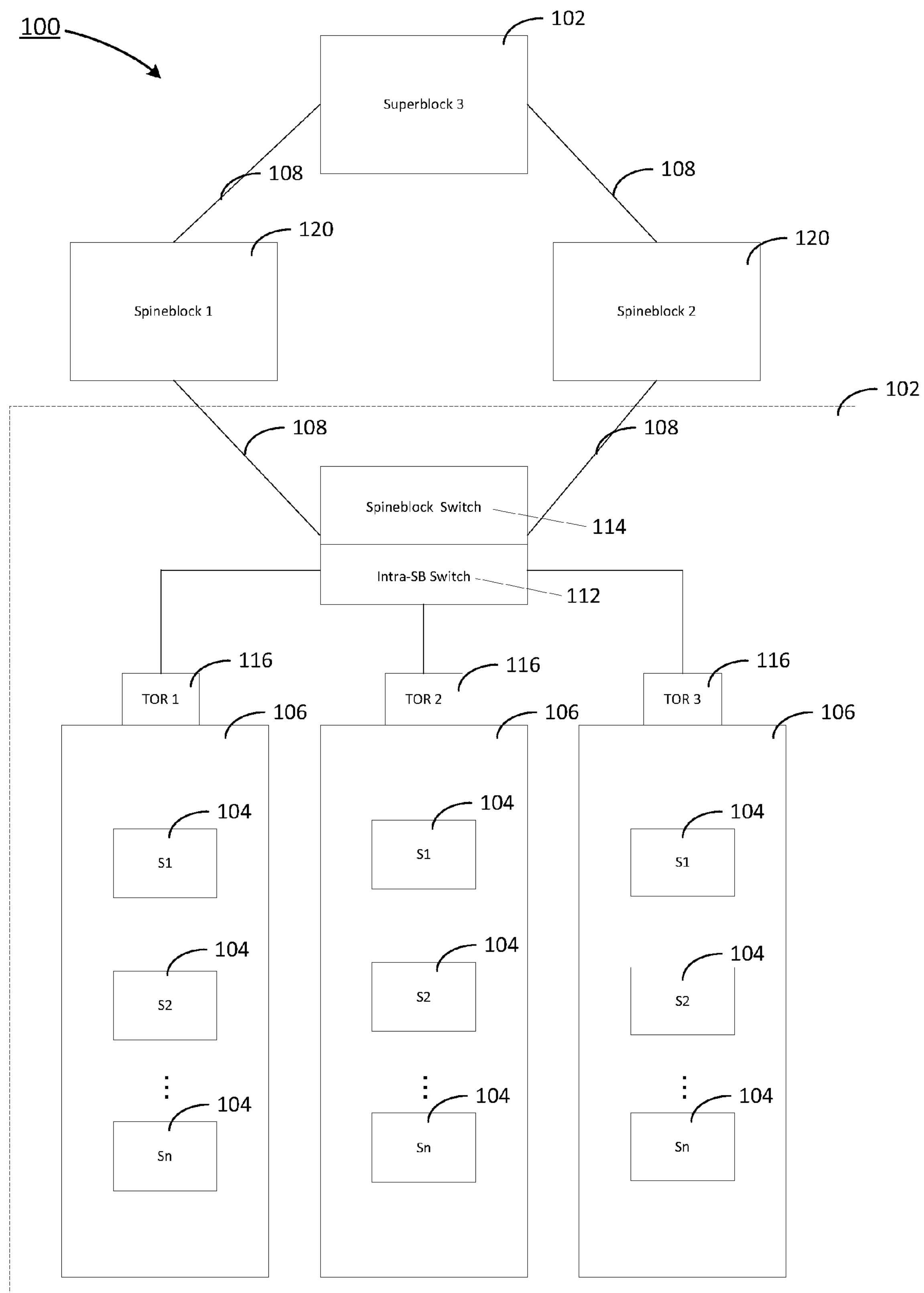
FIG. 1 is a diagram of a data center, according to an illustrative implementation.

FIG. 1 is a block diagram of an example data center 100. The data center 100 includes several interconnected superblocks 102 (also referred to as "pods") and spineblocks 120. Each superblock 102 may include many hundreds, and in some implementations over one thousand, servers 104 arranged in server racks 106. The superblocks 102 and spineblocks 120 are communicatively coupled to one another by optical and/or electrical communication links 108.

Superblocks 102 communicate with other superblocks 102 via spineblocks 120. In some implementations, there are no communication links 108 directly linking superblocks 102. Likewise, in some implementations there are no communication links 108 directly linking spineblocks 120. Each superblock 102 includes an intra-superblock switch 112 for routing communications among the racks 106 included in the superblock 102 or to a spineblock switch 114, which routes data communications between superblocks 102 and spineblocks 120. A spineblock switch 114 may include any number of network ports for sending and receiving data from superblocks 102 to spineblocks 120 in the data center 100. Each network port can support a communication link 108, for example by connecting to an Ethernet cable, fiber optic cable, or any other means for data transmission. While the data center 100 is shown with two superblocks 102 and two spineblocks 120, it should be appreciated that any number of superblocks 102 and spineblocks 120 may be included in the data center 100, and that each superblock 102 may include any number of communication links 108 to spineblocks 120.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers within the rack to the intra-superblock switch 112. In some implementations, the intra-superblock switch 112 may include multiple switches arranged in a hierarchical fashion.

Fairness and throughput guarantees for communication between superblocks 102 via spineblocks 120 in such a network can vary based on the configuration of links 108 between the superblocks 102 and the spineblocks 120. For example, in some implementations the number of network ports on the spineblock switch 114 of each superblock 102 can be larger than the total number of spineblocks 120 in the data center 100. Therefore, the data center 100 can be configured such that each superblock 102 is connected to each spineblock 120 by a common number of communication links 108. If, for each superblock 102, the number of network ports on the spineblock switch 114 is not a multiple of the number of spineblocks 120, there may be unused network ports on the spineblock switch 114 after each superblock 102 has been connected to all of the spineblocks 120 by a common number of communication links 108.

The communication links 108 formed between the remaining unused ports of each spineblock switch 114 are referred to as the interconnectivity slack of the data center 100. Interconnectivity slack links may be allocated in a number of ways. However, some interconnectivity slack configurations may result in higher minimum throughput between superblocks 102 than other configurations. Systems and processes are disclosed that can configure a network such as the data center 100 to achieve balanced interconnectivity between substantially all superblocks 102. A network shared by data flows, is said to be balanced when the minimum inter-superblock connectivity across all superblock pairs is maximized. In some implementations, the inter-superblock connectivity should be as uniform as possible. The concept of balanced interconnectivity is further illustrated below.

Figure 2:
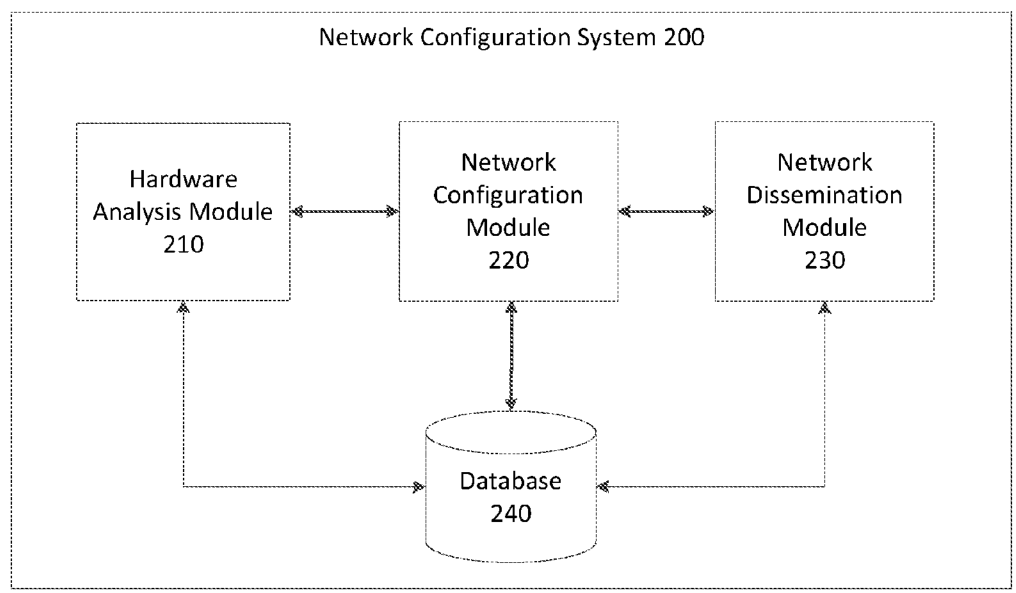
FIG. 2 is a block diagram of a network configuration system, according to an illustrative implementation.

FIG. 2 is a block diagram of a network configuration system 200, according to an illustrative implementation. The network configuration system 200 includes a topology analysis module 210, a network configuration module 220, a configuration dissemination module 230, and a database 240. The components of the network configuration system 200 work to determine initial parameters of a network, generate a network configuration, and disseminate the network configuration information. The configuration generated by the system 200 can help to achieve balanced interconnectivity among the nodes in the network, as discussed above. One exemplary process that can be executed by the system 200 to configure a network is described below in connection with FIG. 4.

In some implementations, the components of the network configuration system 200 can be implemented by special purpose logic circuitry, e.g., an FPGA (field programmable gate array) or an ASIC (application-specific integrated circuit). In other implementations, the components of the network configuration system 200 can be implemented by a general purpose processor. The components can also include, in addition to hardware, code that creates an execution environment for computer programs, e.g., code that constitutes processor firmware, a protocol stack, a database management system, an operating system, a cross-platform runtime environment, a virtual machine, or a combination of one or more of these.

The network configuration system 200 can implement methods to determine a configuration for a network such as the data center 100 shown in FIG. 1. For example, a network can include two stages of nodes. A first stage can correspond to the set of superblocks in the network, and a second stage can correspond to the set of spineblocks in the network. In some implementations, the network can be configured based on the number of nodes M (i.e., superblocks) in the first stage, the number of nodes N (i.e., spineblocks) in the second stage, the number of communication links F supported by each node in the first stage (i.e., the number of network ports on each spineblock switch), and the number of communication links S supported by each node in the second stage (i.e., the number of network ports included on each spineblock).

The topology analysis module 210 can determine values for the parameters M, N, F, and S to be used in such an algorithm. In some implementations, the computer network can include all of the superblocks in a data center, and the number M can represent the total number of superblocks to be included in the data center. The network configuration system 200 can be a computing device located within the data center or otherwise connected to the data center. The topology analysis module 210 can determine the number of superblocks, for example, by broadcasting a request to all superblocks in the data center and determining the total number of unique responses received from superblocks. In some implementations, the number M can then be stored in the database 240 for later retrieval.

The hardware analysis module 210 can also assign index values i from zero to M-1 to each of the superblocks. For example, the responses received from the superblocks can include information corresponding to a unique identifier for each superblock. In some implementations, the unique identifier may be a hardware address such as a MAC address or an IP address of the spine block switch within each superblock. The hardware analysis module 210 can assign an index value i to each unique hardware address. In some implementations, the hardware analysis module 210 can assign the unique index values for each superblock based on a physical location of the superblock. For example, the hardware analysis module 210 may assign consecutive index values to superblocks that are located near each other within the data center. Such an assignment of index values can lead to a simpler and more logically intuitive physical network configuration. The hardware analysis module 210 can then store the index values associated with each superblock in the database 240.

Similarly, the hardware analysis module 210 can determine the value N, representing the total number of switches in the second stage. In some implementations, the second stage of switches includes the spineblocks in the data center. For example, the hardware analysis module 210 can query the spineblocks in the data center by broadcasting an identification request. The hardware analysis module 210 can determine the value for N based on the number of unique responses received from the spineblocks in response to the broadcast query. The hardware analysis module 210 can then store the value S in the database 240.

The hardware analysis module 210 can assign an index value j to each switch in the second stage. In some implementations, the hardware analysis module 210 can assign index values based on the physical locations of the switches in the second stage (i.e., spineblocks). Physical location information can be received from the spineblocks at the hardware analysis module 210 in response to the request for identification discussed above. Alternatively, physical location information may be stored in the database 240, and the hardware analysis module 210 can retrieve the physical location information for the spineblocks from the database 240. The hardware analysis module 210 can then assign consecutive index values to adjacent spineblocks, for example. The index values for the second switch stage can then be stored in the database 240.

The topology analysis module 210 can also determine the number of possible connections supported by each node in the first stage (F) and the number of possible connections supported by each switch in the second stage (S). In implementations in which at least one communication link connects all of the nodes in the network, the topology analysis module 210 can query the nodes by broadcasting a request. For example, the topology analysis module 210 can broadcast a request for superblocks to identify the type of switches used to implement the spineblock switch within each superblock. A similar request can be broadcast to the spineblocks. Based on the responses received, the topology analysis module 210 can determine the number of possible connections for each superblock and each spineblock. For example, nodes (i.e., superblocks and spineblocks) may be identified by manufacturer and model numbers, and the topology analysis module 210 can determine the number of ports associated with each particular node based on manufacturer descriptions. Such descriptions can be stored in the database 240.

In instances where the topology analysis module 210 is not able to communicate directly with any of the network nodes, the topology analysis module can instead determine the parameter values by retrieving them from the database 240. Alternatively, the topology analysis module may receive configuration information for the network components as input from a human operator, and may assign parameter values as discussed above. All of the parameter values can then be stored in the database 240.

The network configuration module 220 can define the communication links between nodes in the network. For example, the network configuration module 220 can perform the steps of a configuration method, an example of which is described below in connection with FIG. 4. In some implementations, the network configuration module 220 can obtain the parameter values required for execution of the algorithm from the database 240, where they can be stored, for example, by the topology analysis module 210. In other implementations, the network configuration module 220 can obtain the parameter values directly from the topology analysis module 210.

The network configuration module 220 then performs the steps of the algorithm to determine the network links. For example, the network configuration module 210 can determine the result of (F−(F % N))/N, where "%" represents the modulo operation, which represents the highest common number of communication links that can be connected from each first stage node to each second stage node. The links formed from the remaining unused network ports are the interconnectivity slack links, which is defined above in connection with FIG. 1. The network configuration module 220 can then determine how to allocate interconnectivity slack links among the remaining unused network ports. In some implementations, the network configuration module 200 can configure the network so that the interconnectivity slack links are allocated in a balanced fashion.

The configuration dissemination module 230 can transmit the information corresponding to the network configuration determined by the network configuration module 220. For example, in some implementations the nodes in the network can be connected via dynamic optical links. The configuration dissemination module 230 can transmit the network configuration information to a controller, which can implement the network configuration by linking the nodes in the network according to the network configuration received from the configuration dissemination module 230. In some implementations, the controller can be a dynamic optical switch controller configured to optically link the selected network nodes. In other implementations, the configuration dissemination module 230 can transmit the network configuration to a human operator, for example by printing the network configuration information to a file. The human operator can then manually configure the network according to the network configuration received from the configuration dissemination module 230. An example of a network whose interconnectivity slack is allocated in a balanced configuration is provided below in connection with FIG. 3. A process for achieving a balanced network is discussed in connection with FIG. 4. Examples of a network configured in an unbalanced fashion and a balanced fashion are then discussed in connection with FIGS. 5A-5D and FIGS. 6A-6D, respectively.

Figure 3:
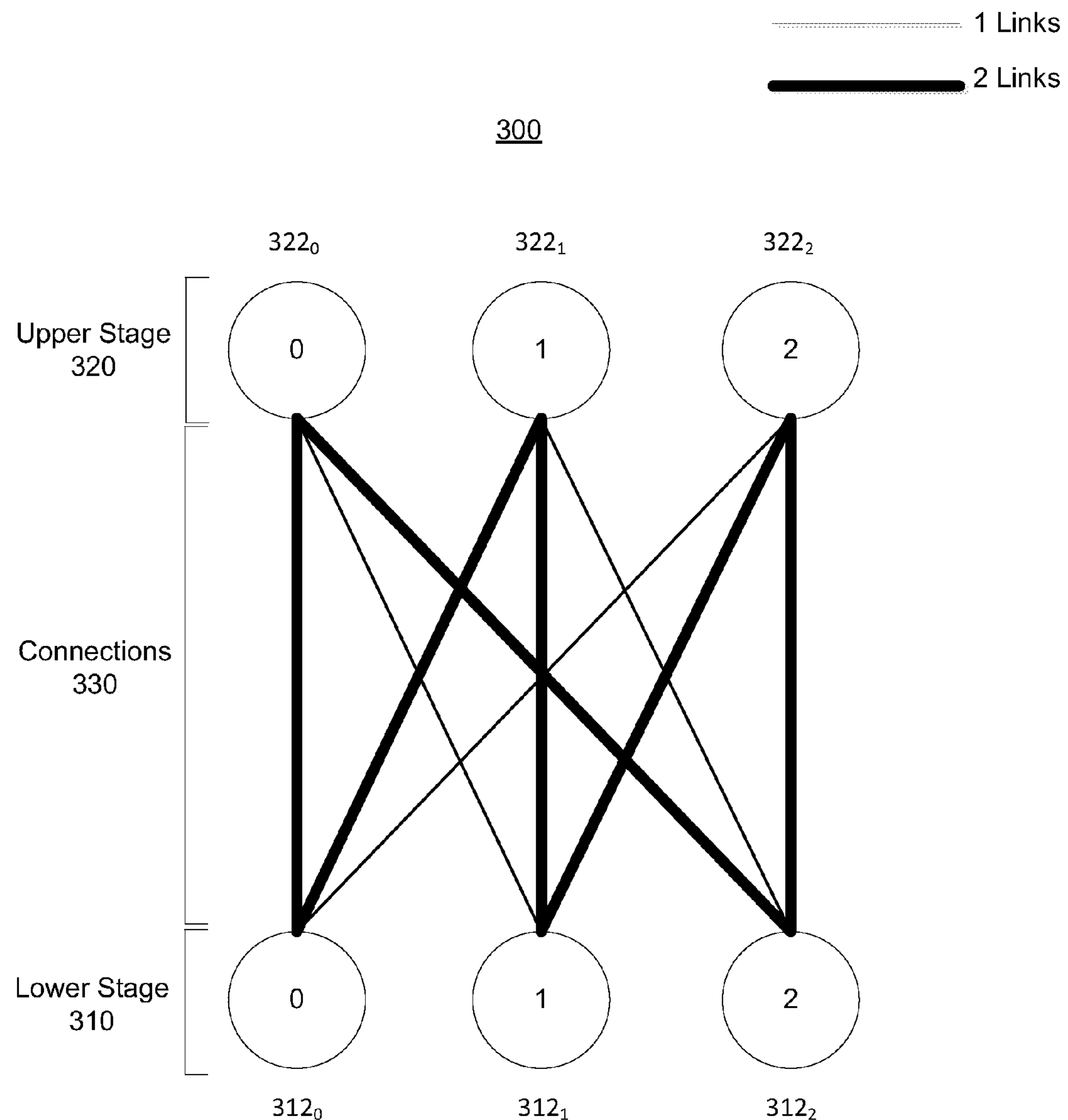
FIG. 3 is an example network whose links are assigned in a balanced fashion, according to an illustrative implementation.

FIG. 3 is an example network 300 whose links are assigned in a balanced fashion, according to an illustrative implementation. The network 300 includes a lower stage 310, an upper stage 320, and several communication links 330. Each node in the lower stage 310 and the upper stage 320 is assigned a sequential integer index value beginning from 0. The network 300 includes the same number of nodes in the both the lower stage 310 and the upper stage 320: three lower stage nodes $\mathbf{312}_0$-$\mathbf{312}_2$ and three upper stage nodes $\mathbf{322}_0$-$\mathbf{322}_2$. Each node in the lower stage 310 includes five links to the nodes in the upper stage 320, and each node in the upper stage 420 includes five links to the nodes in the lower stage 410. Because there are more links from each node than there are nodes in each stage, some node pairs are connected by more than one link. Single links are represented by a thinner line, while double links are represented by a thicker line.

Each node 312 in the lower stage 310 is connected by at least one link to each node 322 in the upper stage 320 of the network 300. The additional links, referred to as interconnectivity slack, are distributed in a balanced fashion, leading to optimal fairness and throughput characteristics of the network 300. The throughput between each pair of nodes 312 in the lower stage 310 can be determined by calculating the throughput along each path connecting the nodes. For example, node $\mathbf{312}_0$ is connected to node $\mathbf{312}_1$ via each node in the upper stage. Node $\mathbf{312}_0$ is connected to node $\mathbf{322}_0$ by two links, while node $\mathbf{312}_1$ is connected to $\mathbf{322}_0$ by one link. Assuming that each link can support one unit of network traffic, the maximum achievable throughput between nodes $\mathbf{312}_0$ and $\mathbf{312}_1$ via node $\mathbf{322}_0$ is thus one traffic unit. Nodes $\mathbf{312}_0$ and $\mathbf{312}_1$ are also each connected to each other through node $\mathbf{322}_1$ by two links, and the maximum achievable throughput along this path is therefore two traffic units. Finally, node $\mathbf{312}_0$ is connected to node $\mathbf{322}_2$ by one link and node $\mathbf{312}_1$ is connected to node $\mathbf{322}_2$ by two links, giving a maximum throughput along this path of one traffic unit.

The total achievable throughput between two nodes is the sum of all achievable throughputs along each path connecting the nodes. Therefore, the total achievable throughput between nodes $\mathbf{312}_0$ and $\mathbf{312}_1$ is 1+2+1=4 units of network traffic. The throughput between the other node pairs in the lower stage 310 (i.e., nodes $\mathbf{312}_0$ & $\mathbf{312}_1$ and nodes $\mathbf{312}_0$ & $\mathbf{312}_1$) can be calculated in a similar manner. Because the maximum throughput between each pair of nodes in the lower stage 310 is the same (i.e., four traffic units), the network 300 is said to be balanced. In some implementations, it may not be possible configure a network such that every node pair in the lower stage supports the same maximum throughput, but it can still be useful to configure the network to be as balanced as possible.

Figure 4:
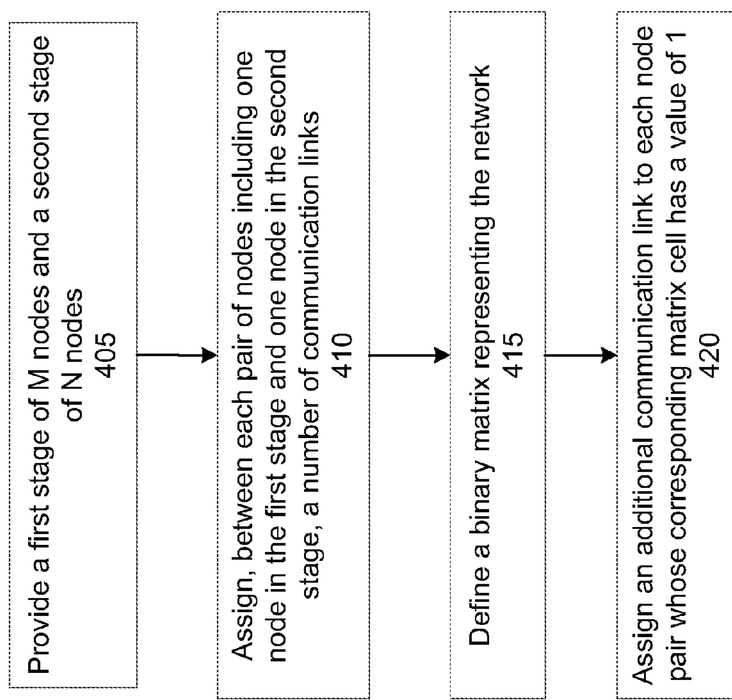
FIG. 4 is a flow diagram of a process for configuring a network, according to an illustrative implementation.

FIG. 4 is a flow diagram of a process 400 for configuring a network, according to an illustrative implementation. The process 400 includes providing a first stage of M nodes and a second stage of N nodes (Step 405), assigning, between each pair of nodes including one node in the first stage and one node in the second stage, a number of communication links (Step 410), defining a binary matrix representing the network (Step 415), and assigning an additional communication link to each node pair whose corresponding matrix cell has a value of 1 (Step 420).

The process 400 includes providing a first stage of M nodes and a second stage of N nodes. For example, the first stage of nodes can be the set of superblocks in a data center, as described above in connection with FIG. 1, and the second stage of nodes can be the set of spineblocks in the data center. In some implementations, each node in the first stage of nodes can form F communication links with nodes in the second stage. Likewise, each node in the second stage can form S communication links with nodes in the first stage.

The process 400 includes assigning, between each pair of nodes including one node in the first stage and one node in the second stage, a number of communication links (Step 410). The number of communication links assigned (Step 410) can be equal to the largest common number of communication links that can be assigned from each node in the first stage to every node in the second stage. For example, the number of links assigned (Step 410) from each node in the first stage to each node in the second stage can be equal to (F−(F % N))/N. After these links are assigned, each lower stage node will be connected to every upper stage node by a common number of communication links. The resulting network will therefore be balanced after this step, but there may be remaining unused network ports on the nodes which can support additional communication links. These additional links are referred to as the interconnectivity slack, which is described above in connection with FIG. 1. The interconnectivity slack links can be assigned in subsequent steps of the process 400 in such a way that the network remains as balanced as possible.

Assigning a communication link between two nodes can include connecting network ports of the two network nodes, for example with an Ethernet cable. In some implementations, the network nodes may be connected to a reconfigurable optical switch. Communication links can therefore be assigned by instructing an optical switch controller to connect the two selected network nodes through the reconfigurable switch. Each communication link assigned to a pair of network nodes occupies a single network port of each node, reducing the number of available network ports on each node by one.

The process 400 includes defining a binary matrix representing the network (Step 415). Rows in the matrix can represent nodes in the first stage and columns can represent nodes in the second stage. The matrix can therefore be an N by M matrix. Sequential index numbers can be assigned to each node in the first and second stages, as discussed above in connection with FIG. 2, and the index numbers can correspond to row and column numbers. Therefore, each cell of the matrix can represent a node pair including one node from the first stage and one node from the second stage.

In some implementations, the matrix can represent the interconnectivity slack in the network. A value of 1 can be assigned to the cells corresponding to each node pair desired to be connected by an interconnectivity slack link. A value of 0 can be assigned to the cells corresponding to node pairs that are not to be connected by an interconnectivity slack link. In some implementations, binary values can be assigned to cells in the matrix such that the resulting network represented by the matrix is as balanced as possible. For example, in implementations in which the matrix rows represent nodes in the first stage and the matrix columns represent nodes in the second stage, values can be assigned to the matrix such that the number of 1s in each row is equal to the remainder of the quotient of F divided by N. This number represents that number of slack links available for each switch in the first stage of nodes. Therefore, assigning matrix values in this way ensures that no network ports are left unused on the nodes in the first stage. Similarly, the number of 1s assigned to each column of the matrix can be equal to N−((F*(M−(M % S)))/S), which represents the number of slack links available to each node in the second stage of switches.

In order to achieve balance in the network (i.e., maximize the minimum throughput between all pairs of first stage nodes), the values of the matrix cells can also be selected such that for any two rows, the number of 1s in the same column is equal to either the floor or the ceiling of (F % N)(S−(M*(S−(S % N)/N))−1)/(M−1), which is the theoretical upper bound of the overlap for each pair of nodes in the first stage, if the interconnectivity slack were allocated in a perfectly balanced manner.

In some implementations, this upper bound will be an integer and therefore the floor and ceiling values will be equal to one another (i.e., the floor and ceiling will be equal to the integer result itself), indicating that the number of columns both having a value of 1 for any two rows in the matrix should be the same. Such is the case for the network shown in FIG. 3, which is configured to achieve exactly the same maximum throughput for every pair of nodes in the lower stage. However, in other implementations it may not be possible to achieve a perfectly balanced network configuration. For example, the value for the theoretical upper bound of the overlap between node pairs in the first stage may not be an integer. If this is the case, it will not be possible achieve the upper bound for every switch pair, because it is impossible to assign a fractional communication link between two nodes. Therefore, in order to achieve the most balanced configuration, the overlap for some first-stage node pairs (i.e., rows in the matrix) will be limited to the floor of the theoretical upper bound, while other pairs will exhibit overlap equal to the ceiling of the perfectly balanced upper bound.

The process 400 includes assigning an additional communication link to each node pair whose corresponding matrix cell has a value of 1 (Step 420). After the matrix is populated in Step 415, a balanced network configuration is achievable by assigning communication links based on the matrix values. Each pair of nodes whose corresponding cell has a value of 1 can be assigned an additional communication link. After the links have been assigned according to the matrix values, there will be no remaining network ports on any of the nodes and the network will be configured in the most balanced way possible.

Figure 5A:
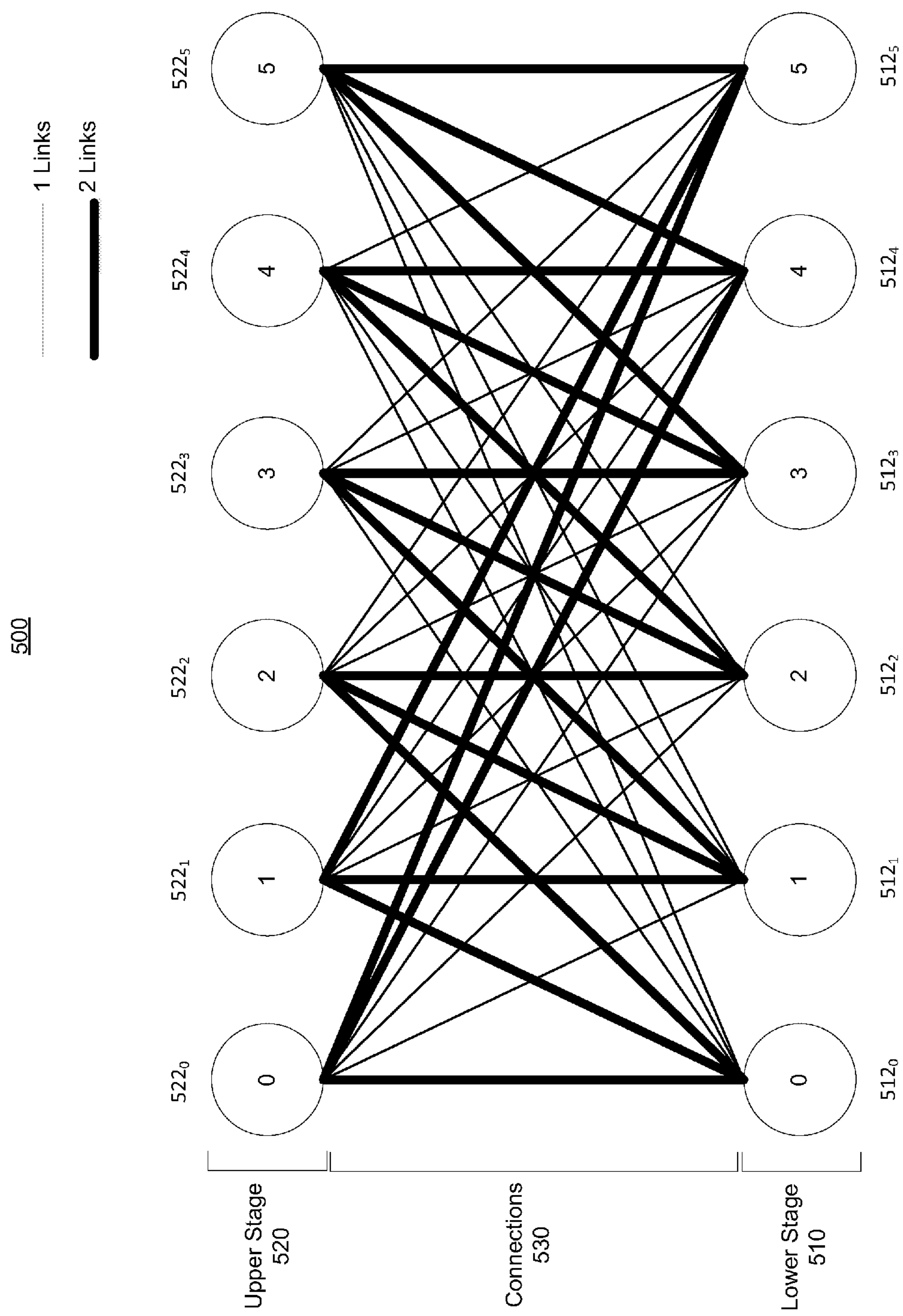
FIG. 5A is an example network whose links are assigned in an unbalanced fashion, according to an illustrative implementation.

FIG. 5A is an example network 500 whose links are assigned in an unbalanced fashion, according to an illustrative implementation. The network 500 includes a lower stage 510, an upper stage 520, and several links 530. Each node in the lower stage 510 and the upper stage 520 is assigned a sequential integer index value beginning from 0. The network 500 includes the same number of nodes in both the lower stage 510 and the upper stage 520. There are six lower stage nodes $\mathbf{512}_0$-$\mathbf{512}_5$ and six upper stage nodes $\mathbf{522}_0$-$\mathbf{522}_5$. Each node in the lower stage 510 includes nine links to the nodes in the upper stage 520, and each node in the upper stage 520 includes nine links to the nodes in the lower stage 510. Because there are more links from each node than there are nodes in each stage, some node pairs are connected by more than one link. Single links are represented by a thinner line, while double links are represented by a thicker line. In some implementations, the nodes 512 in the lower stage 510 can correspond to superblocks in a datacenter and the nodes 522 in the upper stage 520 can correspond to spineblocks in the datacenter, as discussed above in connection with FIG. 1.

Assuming that each link can support one network traffic unit, the minimum throughput achieveable between a pair of nodes 512 in the lower stage 510 is six units of network traffic. For example, nodes $\mathbf{512}_0$ and $\mathbf{512}_3$ can support at most six units of network traffic, because they are coupled by a single link through each of the six switches 522 in the upper stage 520. The highest throughput achievable between a pair of nodes 512 in the lower stage 522 is eight units of network traffic. For example, nodes $\mathbf{512}_0$ and $\mathbf{512}_1$ can support up to eight units of traffic, because they are connected by one communication link through nodes $\mathbf{522}_0$ and $\mathbf{512}_3$-$\mathbf{512}_5$ and by two communication links through nodes $\mathbf{512}_1$ and $\mathbf{512}_2$. Other node pairs, such as nodes $\mathbf{512}_0$ and $\mathbf{512}_2$, can support up to seven units of network traffic. The network 500 is therefore unbalanced, as evidenced by the relatively wide range of throughputs supported by different pairs of nodes 512 in the lower stage 510. For example, in a balanced network, the difference between maximum achievable throughput between any pairs of nodes 512 in the lower stage 510 will be no greater than one. In the network 500, however, some node pairs support eight units of traffic while other pairs support only six, resulting in a difference of two between the maximum achievable throughputs of some node pairs. The network could be reconfigured to correct this error, for example by reallocating the interconnectivity slack links to achieve a more balanced topology. An example of a balanced topology is shown below in FIG. 6A.

Figure 5B:
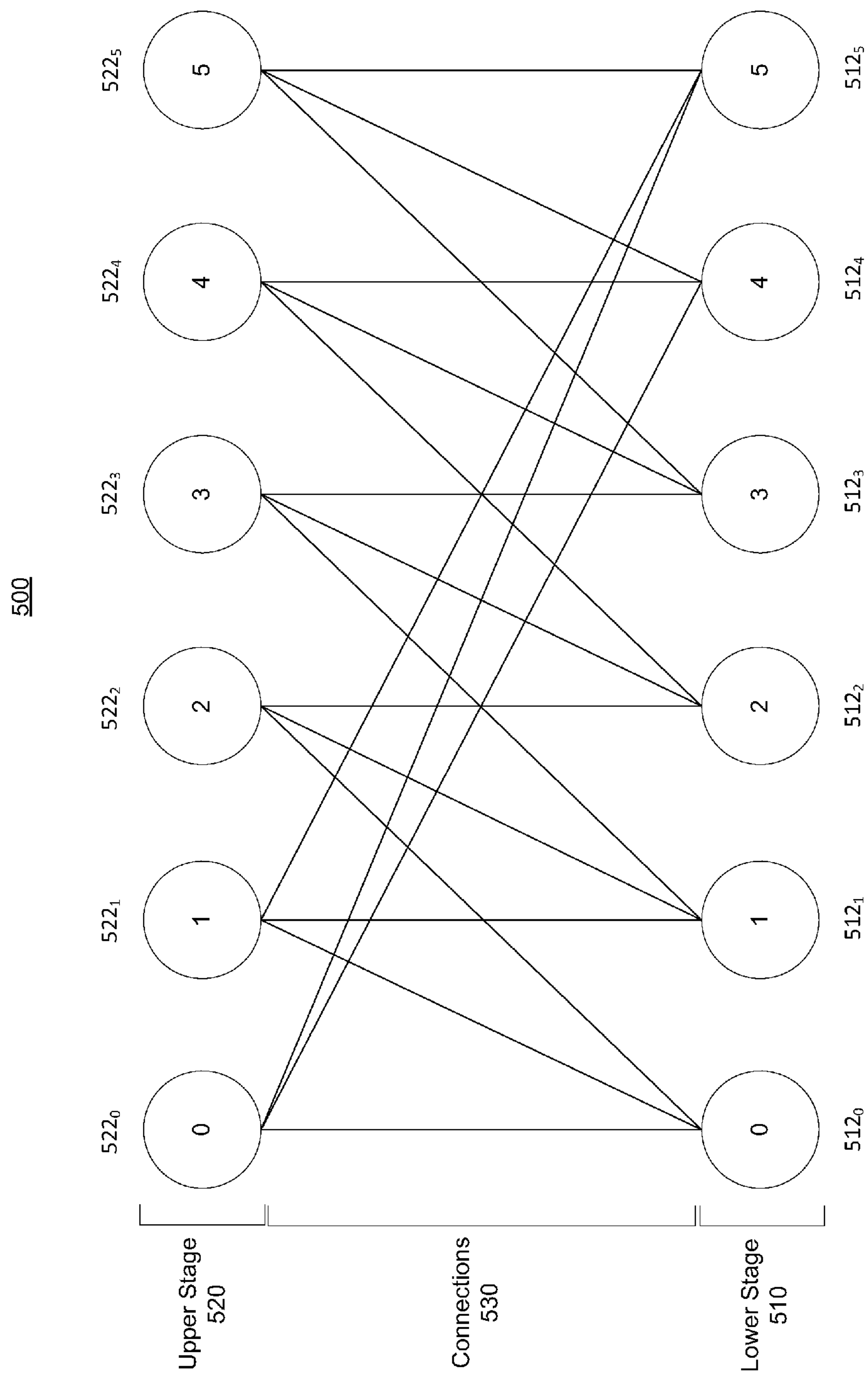
FIG. 5B shows the interconnectivity slack of the network shown in FIG. 5A, according to an illustrative implementation.

FIG. 5B shows the interconnectivity slack of the network 500 shown in FIG. 5A, according to an illustrative implementation. The network 500 is shown with a single link removed from every pair of nodes including one node 512 in the lower stage 510 and one node 522 in the upper stage 520, for illustrative purposes. The remaining links (i.e., the interconnectivity slack links) are allocated in an unbalanced fashion. For example, there is no path between nodes $\mathbf{512}_0$ and $\mathbf{512}_3$ through the interconnectivity slack, while there are two interconnectivity slack paths through nodes $\mathbf{512}_0$ and $\mathbf{512}_1$.

FIG. 5C is a matrix representation 560 of the interconnectivity slack shown in FIG. 5B, according to an illustrative implementation. Rows in the matrix 560 correspond to index values of nodes in the lower stage 510. Columns in the matrix 560 correspond to index values of nodes in the upper stage 520. Each cell in the matrix has a value equal to the number of interconnectivity slack links between the node pair represented by the row and column index values. The matrix 560 corresponds to the matrix defined in Step 415 of the process 400 shown in FIG. 4. However, the values of the cells in the matrix 560 have not been assigned in accordance with the process 400.

In this example, M is equal to 6, N is equal to 6, F is equal to 9, and S is equal to 9. Therefore, the value of (F % N)(S−(M*(S−(S % N)/N))−1)/(M−1), which is the theoretical upper bound of the overlap for a perfectly balanced network, is 1.2. As discussed above, in order for the network to be balanced, the values of the matrix cells should be selected such that for any two rows, the number of 1s in the same column is equal to either the floor or the ceiling of (F % N)(S−(M*(S−(S % N)/N))−1)/(M−1). In this example, any two rows should therefore have one (i.e., the floor value) or two (i.e., the ceiling value) columns that both have a value of 1. This rule is violated, for example, by rows 0 and 3, which have zero columns in which both rows have a 1 (i.e., no overlap).

FIG. 5D is an overlap matrix 570 associated with the unbalanced network 500 shown in FIG. 5A, according to an illustrative implementation. The matrix 570 shows the number of slack links connecting each pair of nodes 512 in the lower stage 510. Both the rows and the columns of the matrix 570 represent nodes 512. The cells along the main diagonal of the matrix 570 have no assigned value, because a node 512 cannot be connected to itself by an interconnectivity slack link. The unbalanced nature of the network 500 is apparent from the fact that three node pairs (i.e., nodes $512_0$ & $512_3$, nodes $512_1$ & $512_4$, and nodes $512_2$ & $512_5$) are connected by a number of slack links that is below the floor value of (F % N)(S−(M*(S−(S % N)/N))−1)/(M−1), as discussed above.

Figure 6A:
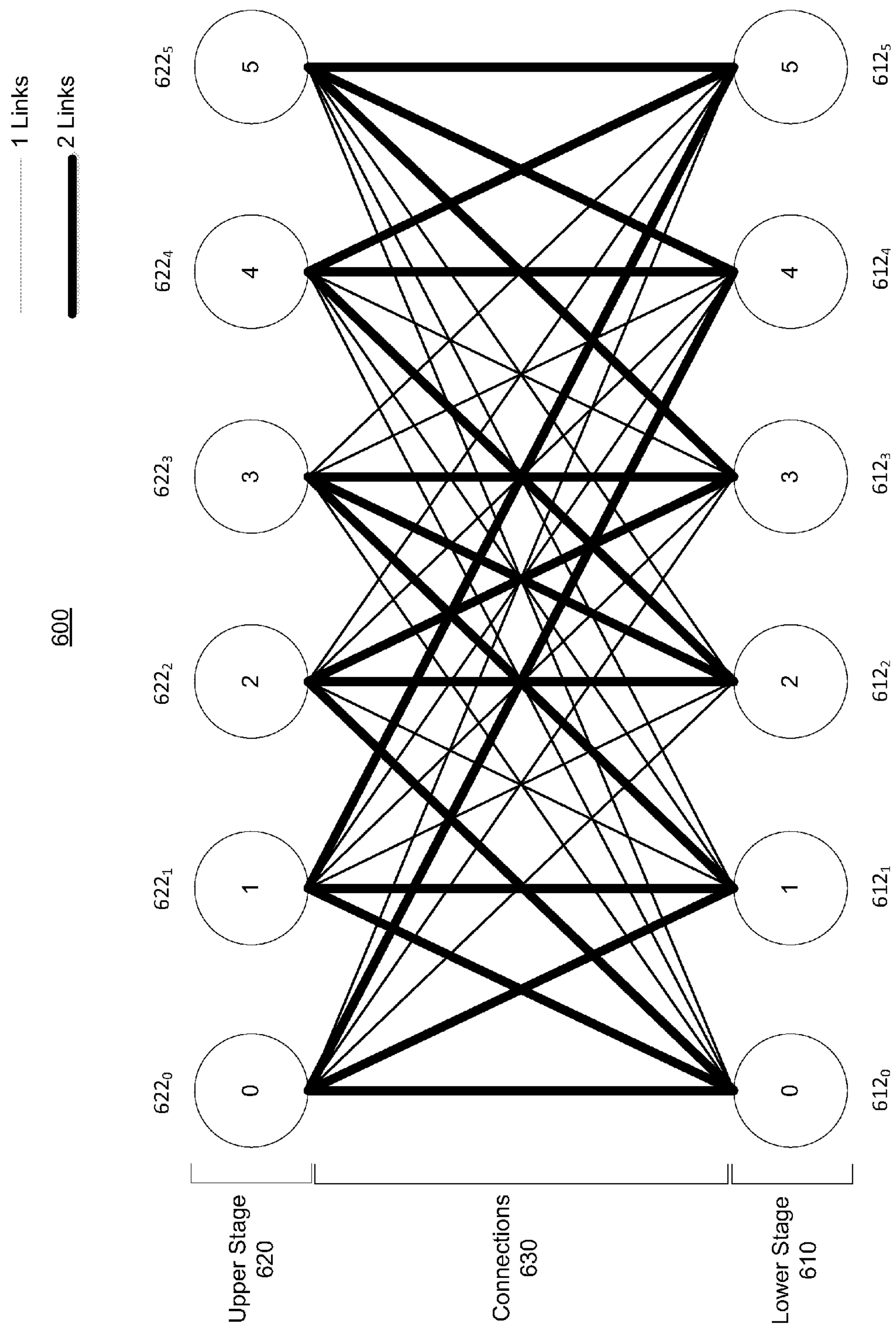
FIG. 6A is an example network whose links are assigned in a balanced fashion, according to an illustrative implementation.

FIG. 6A is an example network 600 whose links are assigned in a balanced fashion, according to an illustrative implementation. The nodes of the network 600 are identical to the those of the network 500 shown in FIG. 5A. However, the connections 630 are configured such that the network 600 is balanced. For example, the network 600 includes a lower stage 610, an upper stage 620, and several connections 630. Each node in the lower stage 610 and the upper stage 620 is assigned a sequential integer index value beginning from 0. The network 600 includes the same number of nodes in both the lower stage 610 and the upper stage 620. There are six lower stage nodes $612_0$-$612_5$ and six upper stage nodes $622_0$-$622_5$. Each node in the lower stage 610 includes nine links to the nodes in the upper stage 620, and each node in the upper stage 620 includes nine links to the nodes in the lower stage 610. Because there are more links from each node than there are nodes in each stage, some node pairs are connected by more than one link. Single links are represented by a thinner line, while double links are represented by a thicker line. In some implementations, the nodes 612 in the lower stage 610 can correspond to superblocks in a datacenter and the nodes 622 in the upper stage 620 can correspond to spineblocks in the data center, as discussed above in connection with FIG. 1.

Assuming that all of the links can support one network traffic unit, the minimum throughput achieveable between a pair of nodes 612 in the lower stage 610 is seven units of network traffic. For example, nodes $612_0$ and $612_3$ can support up to seven units of network traffic, because they are coupled by a single link through each of the six switches 622 in the upper stage 620 except for node $622_2$, through which they are coupled by two links. The highest throughput achievable between a pair of nodes 612 in the lower stage 622 is eight units of network traffic. For example, nodes $612_0$ and $612_1$ can support up to eight units of traffic, because they are connected by one communication link through nodes $612_2$-$612_5$ and by two communication links through nodes $612_0$ and $612_1$. The network 600 is balanced, because the difference in the minimum achievable throughput between any pairs of nodes 612 in the lower stage 610 is no greater than one.

Figure 6B:
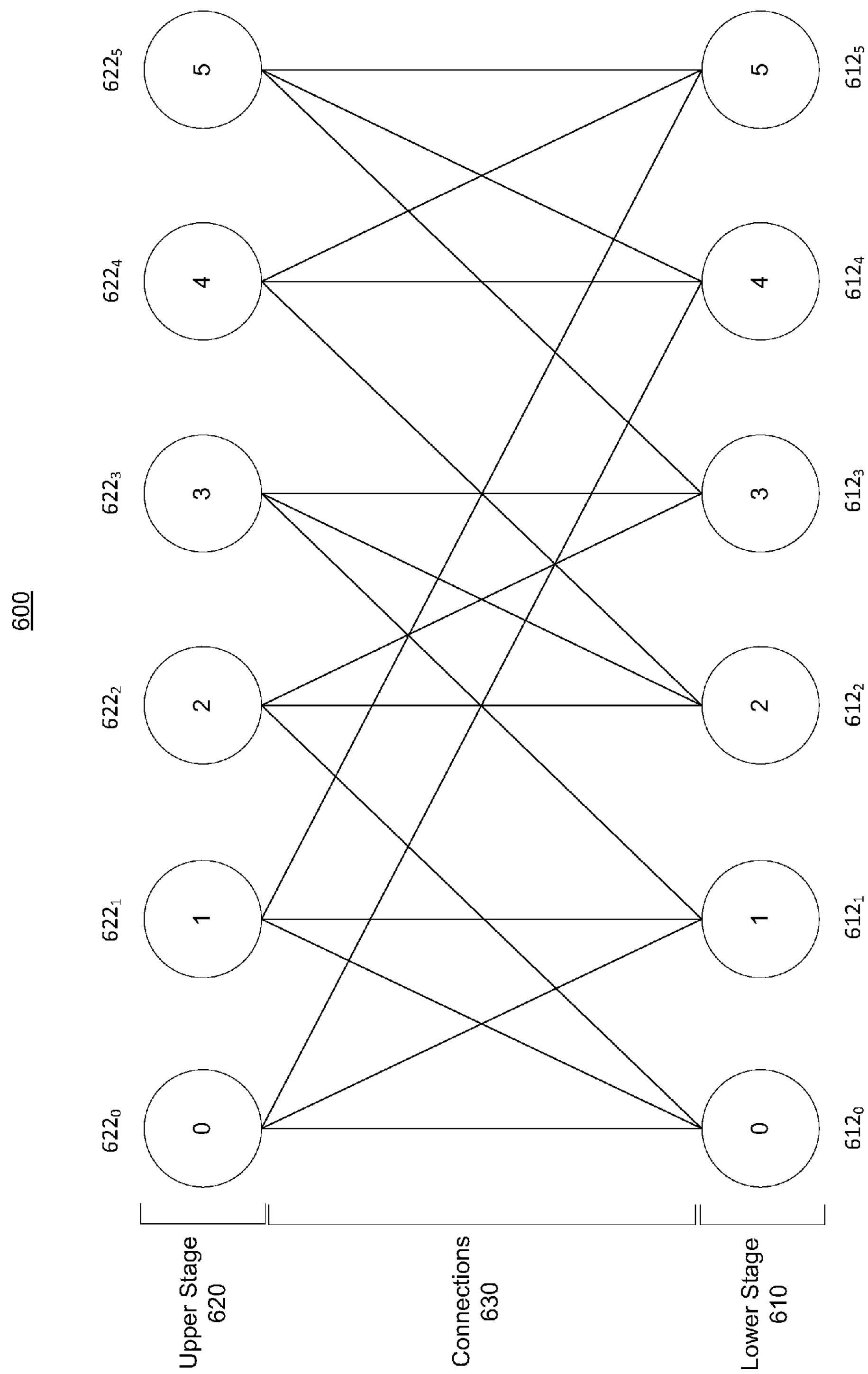
FIG. 6B shows the interconnectivity slack of the network shown in FIG. 6A, according to an illustrative implementation.

FIG. 6B shows the interconnectivity slack of the network 600 shown in FIG. 6A, according to an illustrative implementation. The network 600 is shown with a single link removed from every pair of nodes that includes one node 612 in the lower stage 610 and one node 622 in the upper stage 620. The remaining links (i.e., the interconnectivity slack links) are allocated in an balanced fashion. That is, the overlap of the slack links is configured such that the minimum achievable throughput between any lower stage pair is maximized. In this example, the minimum achievable throughput is seven, whereas in the network 500 shown in FIG. 5, the minimum achievable throughput is six.

FIG. 6C is a matrix representation 660 of the interconnectivity slack shown in FIG. 6B, according to an illustrative implementation. Rows in the matrix 660 correspond to index values of nodes in the lower stage 610. Columns in the matrix 660 correspond to index values of nodes in the upper stage 620. Each cell in the matrix has a value equal to the number of interconnectivity slack links between the node pair represented by the row and column index values. The matrix 660 corresponds to the matrix defined in Step 415 of the process 400 shown in FIG. 4. However, the values of the cells in the matrix 660 have not been assigned in accordance with the process 400.

In this example, as was the case in the example shown in FIG. 5A, M is equal to 6, N is equal to 6, F is equal to 9, and S is equal to 9. Therefore, the value of (F % N)(S−(M*(S−(S % N)/N))−1)/(M−1), which is the theoretical upper bound of the overlap for a perfectly balanced network, is again 1.2. As discussed above, in order for the network to be balanced, the values of the matrix cells should be selected such that for any two rows, the number of 1s in the same column is equal to either the floor or the ceiling of (F % N)(S−(M*(S−(S % N)/N))−1)/(M−1). In this example, any two rows should therefore have one (i.e., the floor value) or two (i.e., the ceiling value) columns that both have a value of 1. The matrix 660 complies with this rule, resulting in a balanced configuration for the network 600.

FIG. 6D is an overlap matrix 670 associated with the balanced network 600 shown in FIG. 6A, according to an illustrative implementation. The matrix 670 shows the number of slack links connecting each pair of nodes 612 in the lower stage 610. Both the rows and the columns of the matrix 670 represent nodes 612. The cells along the main diagonal of the matrix 670 have no assigned value, because a node 612 cannot be connected to itself by an interconnectivity slack link. The balanced nature of the network 600 is illustrated by the fact that every pair of nodes 612 is connected by a number of slack links that is either the floor value or the ceiling value of (F % N)(S−(M*(S−(S % N)/N))−1)/(M−1), as discussed above.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term “data processing apparatus” or “computing device” encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for configuring a network comprising a first stage of M nodes and a second stage of N nodes, wherein each node in the first stage can form F communication links with nodes in the second stage and each node in the second stage can form S communication links with nodes in the first stage, the method comprising:

assigning, between each pair of network nodes including one node in the first stage and one node in the second stage, a number of communication links equal to (F−(F % N))/N;

defining a binary matrix representing the network, wherein rows of the matrix represent nodes in the lower stage, columns in the matrix represent nodes in the upper stage, and values of cells in the matrix represent the remaining communication links between each node pair;

setting the value of each cell of the matrix to a 1 or a 0, such that a number of 1s in each row of the matrix does not exceed a first selected value, a number of 1s in each column of the matrix does not exceed a second selected value, and a number of 1s in the same column for any two rows of the matrix is equal to one of the floor and ceiling of a third selected value; and controlling a reconfigurable switch to form an additional communication link between the nodes of each node pair whose corresponding matrix cell has a value of 1.

2. The computer-implemented method of claim 1, wherein the first selected value is equal to the remainder of the quotient of F divided by N.

3. The computer-implemented method of claim 1, wherein the second selected value is equal to N−((F*(M−(M % S)))/S).

4. The computer-implemented method of claim 1, wherein the third selected value is equal to (F % N)(S−(M*(S−(S % N)/N))−1)/(M−1).

5. The computer-implemented method of claim 1, wherein the method assigns communication links such that the maximum difference between the number of communication links assigned to any pair of network nodes is one.

6. The computer-implemented method of claim 1, wherein the method assigns communication links such that the minimum throughput between all pairs of nodes in the first stage is maximized.

7. The computer-implemented method of claim 1, further comprising disseminating the communication link assignments to a dynamic optical switch coupled to the network nodes.

8. A system for configuring a network comprising a first stage of M nodes and a second stage of N nodes, wherein each node in the first stage can form F communication links with nodes in the second stage and each node in the second stage can form S communication links with nodes in the first stage, the system comprising:

a data processing system configured to:

assign, between each pair of network nodes including one node in the first stage and one node in the second stage, a number of communication links equal to (F−(F % N))/N;

define a binary matrix representing the network, wherein rows of the matrix represent nodes in the lower stage, columns in the matrix represent nodes in the upper stage, and values of cells in the matrix represent the remaining communication links between each node pair;

set the value of each cell of the matrix to a 1 or a 0, such that a number of 1s in each row of the matrix does not exceed a first selected value, a number of 1s in each column of the matrix does not exceed a second selected value, and a number of 1s in the same column for any two rows of the matrix is equal to one of the floor and ceiling of a third selected value; and assign an additional communication link between the nodes of each node pair whose corresponding matrix cell has a value of 1; and a plurality of reconfigurable switches configured to implement the assignments of communication links performed by the data processing system.

9. The system of claim 8, wherein the data processing system is further configured to calculate the first selected value as the remainder of the quotient of F divided by N.

10. The system of claim 8, wherein the data processing system is further configured to calculate the second selected value as N−((F*(M−(M % S)))/S).

11. The system of claim 8, wherein the data processing system is further configured to calculate the third selected value as (F % N)(S−(M*(S−(S % N)/N))−1)/(M−1).

12. The system of claim 8, wherein the data processing system is further configured to assign communication links such that the maximum difference between the number of communication links assigned to any pair of network nodes is one.

13. The system of claim 8, wherein the data processing system is further configured to assign communication links such that the minimum throughput between all pairs of nodes in the first stage is maximized.

14. The system of claim 8, further comprising disseminating a dynamic optical switch coupled to the nodes, wherein the data processing system is further configured to disseminate the communication link assignments to the dynamic optical switch.

15. A non-transitory computer readable storage medium having instructions encoded thereon which, when executed by a processor, cause the processor to perform a method for configuring a network comprising a first stage of M nodes and a second stage of N nodes, wherein each node in the first stage can form F communication links with nodes in the second stage and each node in the second stage can form S communication links with nodes in the first stage, the method comprising:

assigning, between each pair of network nodes including one node in the first stage and one node in the second stage, a number of communication links equal to (F−(F % N))/N;

defining a binary matrix representing the network, wherein rows of the matrix represent nodes in the lower stage, columns in the matrix represent nodes in the upper stage, and values of cells in the matrix represent the remaining communication links between each node pair;

setting the value of each cell of the matrix to a 1 or a 0, such that a number of 1s in each row of the matrix does not exceed a first selected value, a number of 1s in each column of the matrix does not exceed a second selected value, and a number of 1s in the same column for any two rows of the matrix is equal to one of the floor and ceiling of a third selected value; and assigning an additional communication link to each node pair whose corresponding matrix cell has a value of 1.

16. The non-transitory computer readable storage medium of claim 15, wherein the instructions, when executed by the processor, cause the processor to calculate the first selected value as the remainder of the quotient of F divided by N.

17. The non-transitory computer readable storage medium of claim 15, wherein the instructions, when executed by the processor, cause the processor to calculate the second selected value as N−((F*(M−(M % S)))/S).

18. The non-transitory computer readable storage medium of claim 15, wherein the instructions, when executed by the processor, cause the processor to calculate the third selected value as (F % N)(S−(M*(S−(S % N)/N))−1)/(M−1).

19. The non-transitory computer readable storage medium of claim 15, wherein the instructions, when executed by the processor, cause the processor to assign communication links such that the maximum difference between the number of communication links assigned to any pair of network nodes is one.

20. The non-transitory computer readable storage medium of claim 15, wherein the instructions, when executed by the processor, cause the processor to assign communication links such that the minimum throughput between all pairs of nodes in the first stage is maximized.

21. The non-transitory computer readable storage medium of claim 15, wherein the instructions, when executed by the processor, cause the processor to disseminate the communication link assignments to a dynamic optical switch coupled to the network nodes.

* * * * *